/

US 8,200,556 B2

(12) United States Patent
Kramer et al.

(10) Patent No.: US 8,200,556 B2
(45) Date of Patent: *Jun. 12, 2012

(54) ISSUER SUPPORT SERVICES

(75) Inventors: Celia F. Kramer, Charleston, SC (US); Joseph A. Hawley, Potomac, MD (US); Lisa Roberts, Derwood, MD (US); Pamela W. Skinner, Bowie, MD (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 2499 days.

This patent is subject to a terminal disclaimer.

(21) Appl. No.: 10/219,453

(22) Filed: Aug. 15, 2002

(65) Prior Publication Data

US 2003/0097322 A1      May 22, 2003

Related U.S. Application Data

(60) Provisional application No. 60/314,027, filed on Aug. 21, 2001, provisional application No. 60/340,787, filed on Oct. 30, 2001.

(51) Int. Cl.
*G06Q 40/00* (2006.01)

(52) U.S. Cl. .......................................... 705/35; 705/37

(58) Field of Classification Search .................... 705/36, 705/37, 35; 707/102
See application file for complete search history.

(56) References Cited

U.S. PATENT DOCUMENTS

| | | | |
|---|---|---|---|
| 5,893,079 A * | 4/1999 | Cwenar | 705/36 R |
| 6,122,635 A * | 9/2000 | Burakoff et al. | 707/102 |
| 2002/0091621 A1* | 7/2002 | Conklin et al. | 705/37 |
| 2003/0050879 A1* | 3/2003 | Rosen et al. | 705/35 |

OTHER PUBLICATIONS

Thibaud, Jean, "France," Mar. 1993, International Financial Law Review, p. 15.*

* cited by examiner

*Primary Examiner* — Samica L Norman
(74) *Attorney, Agent, or Firm* — Nixon & Vanderhye P.C.

(57) ABSTRACT

A process, residing on a server, provides issuer support services to a financial market. A compliance process reviews issue and issuer data and filing and financial data, which is received from a first data source and concerns a specific issuer and one or more securities issued by the specific issuer, to determine if the specific issuer is in compliance with the listing requirements for the market on which the one or more securities are traded. The compliance process generates compliance data indicative of the specific issuer's state of compliance.

26 Claims, 2 Drawing Sheets

US 8,200,556 B2

ISSUER SUPPORT SERVICES

RELATED APPLICATIONS

This application claims the priority of U.S. Provisional Patent Application No. 60/314,027, filed on Aug. 21, 2001, and entitled "Web Based Securities Based Issuer Support Services".

This application claims the priority of U.S. Provisional Patent Application No. 60/340,787, filed on Oct. 30, 2001, and entitled "Issuer Support Services (ISS)".

BACKGROUND

This invention relates to issuer support services for financial markets. Security markets, such as The Nasdaq Stock Market and The New York Stock Exchange, allow securities for an issuer of securities to trade these securities. In the United States, securities markets are governed by the Securities and Exchange Commission (SEC). Any company wishing to offer securities on a securities market must adhere to the requirements for that market, as specified by the SEC. Some securities markets are self-regulating. That is, regulation of such markets is the responsibility of the markets. Through such regulation, the markets ensure that the companies adhere to state and federal securities laws and SEC regulations. Additionally, the security markets require their listing companies to adhere to market-specified requirements. One way that the companies listed on a securities market adhere to such regulation is to provide information to the SEC and the securities market to show that the companies are in compliance with these requirements.

SUMMARY

According to an aspect of this invention, a process, residing on a server, provides issuer support services to a financial market. A compliance process reviews issue and issuer data and filing and financial data, which is received from a first data source and concerns a specific issuer and one or more securities issued by the specific issuer, to determine if the specific issuer is in compliance with the listing requirements for the market on which the one or more securities are traded. The compliance process generates compliance data indicative of the specific issuer's state of compliance.

One or more of the following features may also be included. A graphical user interface allows a user to operate the compliance process. A trade process receives, from a second data source, trade data concerning the securities issued by the specific issuer. The graphical user interface is a web browser. The first data source is a database maintained by a governmental regulatory agency, and the second data source is a trade database for the market on which the one or more securities are traded. A database organizes the compliance data, the filing and financial data, the trade data, and the issue and issuer data, which are stored on a storage device.

A tabular presentation process presents to the user a composite report that includes the compliance data, the filing and financial data, the trade data, and the issue and issuer data. A data management process allows the user to manage at least one of: the issue and issuer data received from the first data source; the filing and financial data received from the first data source; the trade data received from the second data source; and the compliance data generated by the compliance process. The compliance process further includes a communication logging process for maintaining a communication log outlining communications between the user and the specific issuer. A pre-alert process provides a listing qualification analyst with a warning concerning the specific issuer approaching a point of non-compliance with the listing requirements for the market on which the securities are traded.

According to a further aspect of this invention, a method for providing issuer support services to a financial market includes reviewing issue and issuer data and filing and financial data, which is received from a first data source and concerns a specific issuer and one or more securities issued by the specific issuer. A determination is made concerning whether the specific issuer is in compliance with the listing requirements for the market on which the one or more securities are traded. Compliance data is generated that is indicative of the specific issuer's state of compliance.

One or more of the following features may also be included. Trade data concerning the one or more securities issued by the specific issuer is received from a second data source. The compliance data, the filing and financial data, the trade data, and the issue and issuer data are organized on a storage device. The user is presented with a composite report that includes the compliance data, the filing and financial data, the trade data, and the issue and issuer data. The user is allowed to manage at least one of: the issue and issuer data received from the first data source; the filing and financial data received from the first data source; the trade data received from the second data source; and the compliance data generated by the method.

A communication log is maintained that outlines communications between the user and the specific issuer. A listing qualification analyst is provided with a warning concerning the specific issuer approaching a point of non-compliance with the listing requirements for the market on which the one or more securities are traded.

According to a further aspect of this invention, a computer program product residing on a computer readable medium has a plurality of instructions stored on it. When these instructions are executed, they cause the processor to review issue and issuer data and filing and financial data, which is received from a first data source and concerns a specific issuer and one or more securities issued by the specific issuer. A determination is made concerning whether the specific issuer is in compliance with the listing requirements for the market on which the one or more securities are traded. Compliance data is generated that is indicative of the specific issuer's state of compliance.

One or more of the following features may also be included. Trade data is received, from a second data source, concerning the one or more securities issued by the specific issuer. The compliance data, the filing and financial data, the trade data, and the issue and issuer data are organized on a storage device.

The user is presented with a composite report that includes the compliance data, the filing and financial data, the trade data, and the issue and issuer data. The user is allowed to manage at least one of: the issue and issuer data received from the first data source; the filing and financial data received from the first data source; the trade data received from the second data source; and the generated compliance data. A communication log is maintained that outlines communications between the user and the specific issuer. A listing qualification analyst is provided with a warning concerning the specific issuer approaching a point of non-compliance with the listing requirements for the market on which the one or more securities are traded.

One or more advantages can be provided from the above. The process of verifying issue and issuer data, filing and financial data, and trading data can be streamlined. Further, the compliance review process can be automated. Additionally, by presenting the user with a composite report that provides a summary for a specific issuer, the efficiency of any manual review and verification process can be improved. Further, by providing a listing qualification analyst with a warning whenever an issuer is in danger of becoming non-compliant, the ramifications associated with non-compliance can possibly be avoided. Additionally, as this process and method is web-based and useable through a web-browser, no specialized hardware is required to operate the system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
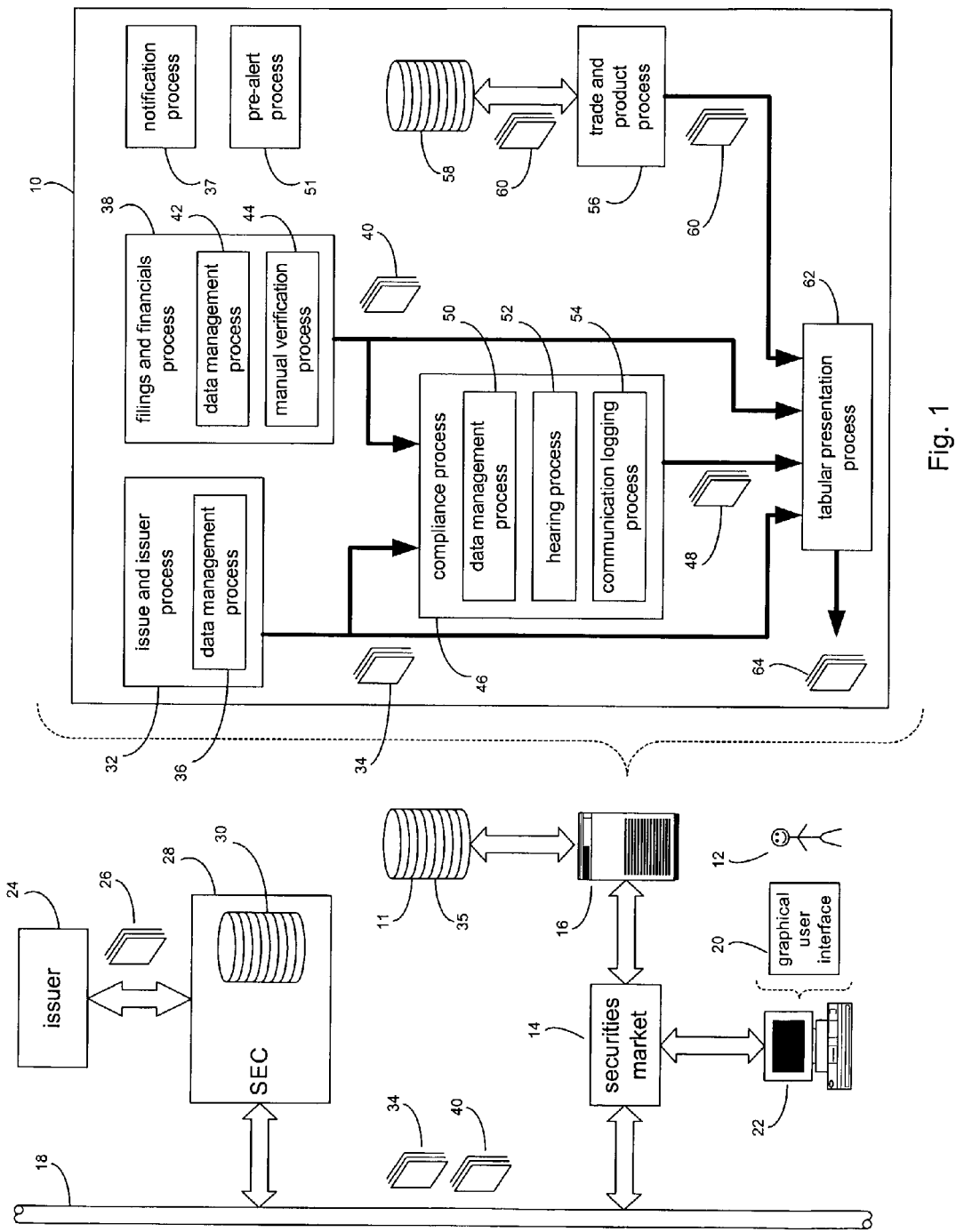
FIG. 1 is a block diagram of an issuer support services process.

Referring to FIG. 1, a process 10 for providing issuer support services to a user 12 is shown. Process 10 is typically used by a securities market 14 (e.g., NYSE™, Nasdaq™, etc.) to receive and organize filings made by issuers (i.e., companies that offer stock on that securities market). These filings are made to both the SEC and the securities market itself. By monitoring the filings of an issuer, the securities market can ensure that the issuer meets the listing requirements for that market (as specified by the SEC and the securities market).

Process 10 resides on storage device 11 of server 16, which is connected to a distributed computing network 18. Storage device 11 could be a hard disk drive, a tape drive, an optical drive, a RAID array, a random access memory (RAM), or a read only memory (ROM). Distributed computing network 18 could be the Internet, an intranet, a local area network or any other form of network environment. Process 10 is accessed via a graphical user interface 20 running on a remote desktop computer 22, which is also connected to network 18. The graphical user interface 20 can be a web browser, such as Microsoft Internet Explorer™ or Netscape Navigator™.

Process 10 is typically a web-enabled process that is accessible through a web browser. Since web browsers are cross platform compatible, by configuring process 10 so that it is a web-based process, hardware compatibility problems of remote desktop computer 22 are reduced. Server 16 runs some form of web server software, such as Microsoft Internet Information Server.

As required by SEC rules, issuer 24 provides various filings 26 to the SEC 28 on a regular basis. Examples of these filings are 10K (for annual filings), 10Q (for quarterly filings), and annual proxy filings. Included in these filings are issue and issuer data, filings and financials data, and trading data. The SEC 28 organizes and stores these filings 26 on a database 30 (e.g., the EDGAR database). Database 30 provides a copy of these filings to securities market 14 via network 18.

Process 10 includes an issue and issuer process 32 that receives, from database 30, issue and issuer data 34 concerning a specific issuer 24 and the securities offered by that issuer. If issuer 24 offers more than one type of stock (e.g., preferred, common, etc.) that issuer is required by the SEC to file information concerning all the types of securities offered by that issuer. Examples of this issue and issuer data 34 provided by issuer 14 are the issuer's name, the issuer's address, the number of board members, the names of the board members, the auditor's name, the number of independent directors on the audit committee, date of audit committee written charter, the most recent peer review opinion (concerning the issuer); and total shares outstanding, and an issue market indicator (concerning the issues).

Since the issuer 24 provides this information to the SEC, securities market 14 may retrieve this issue and issuer data 34 from the SEC 28 or the SEC may broadcast this data to the securities market 14. Once retrieved (or received) from the SEC, securities market 14 stores this issue and issuer data 32 on database 35, which is maintained by securities market 14 and resides on storage device 11. Typically, each time a document or group of documents (i.e., issue and issuer data 34) is received by issue and issuer process 32, a unique DCN (document control number) is assigned to that document so that it can be tracked, organized, and retrieved.

Issue and issuer process 32 includes a data management process 36 that allows user 12 to manage the issue and issuer data 34 stored on database 35. Therefore, user 12 can manually inspect the data 34 obtained from the SEC to see if any of the information is incorrect or missing. Additionally, user 12 can supplement the issue and issuer data 34 stored on storage device 11.

User 12 typically establishes a qualification profile (not shown) for each issuer, such that this qualification profile specifies the listing qualification analyst assigned to that particular issuer. When issue and issuer data 34 is received by issue and issuer process 32, that issuer's issuer qualification profile is accessed to determine the listing qualification analyst assigned to that issuer. Once determined, notification process 37 notifies the listing analyst of the receipt of that issue and issuer data 34.

Process 10 further includes a filing and financial process 38 that receives, from database 30, filing and financial data 40 concerning a specific issuer 24. Examples of this filings and financial data 40 are total assets, total liabilities, total equity, and net tangible assets (for balance sheet items); and year-to-date total revenue, year-to-date net income, and earnings before interest and taxes (for income statement items). Again, as the issuer 24 provides this information to the SEC, securities market 14 may retrieve the filings and financial data 40 from the SEC 28 or the SEC may broadcast the data to the securities market 14. Filing and financial data 40 is also stored on database 35

Filing and financial process 38 also includes a data management process 42 that allows user 12 to manage the filing and financial data 40 stored on database 35. As above, the user 12 can manually inspect the data 40 obtained from the SEC to see if any of the information is incorrect or missing. Typically, each time a document or group of documents (i.e., filings and financial data 40) is received by filing and financial process 38, a unique DCN (document control number) is assigned to that document so that it can be tracked, organized, and retrieved. When filing and financial data 40 (concerning an issuer) is received by filing and financial process 38, that issuer's issuer qualification profile is accessed to determine the listing qualification analyst assigned to that issuer. Once determined, notification process 37 notifies the listing analyst of the receipt of that filing and financial data 40.

Additionally, filing and financial process 38 includes a manual verification process 44 so that the assigned listing qualification analyst can review and confirm each piece of filing and financial data 40 stored on database 35.

A compliance process 46 processes the issue and issuer data 34 and the filing and financial data 40 stored on database 35 to determine if the specific issuer 24 is in compliance with the listing requirements for the market on which the securities offered by that issuer 24 are listed. These listing requirements include both the requirements specified by the stock market on which the issue is traded (e.g., market capitalization requirements), and the requirements promulgated by the Securities and Exchange Commission (e.g., timely filing of financial disclosure statement with the SEC). This compliance process 46 may be manually run or configured to run at user-defined intervals or times. These intervals or times can be defined by user 12 via graphical user interface 20. For example, it may be desirable to have compliance process 46 run in the middle of the night when trading activity is greatly reduced.

The specific listing requirements vary depending on the market on which the securities are traded. For example, for The Nasdaq Stock Market, the listing requirements are as follows:

|  | Initial Listing | | | Continued Listing | |
| --- | --- | --- | --- | --- | --- |
| Requirements | Standard 1 | Standard 2 | Standard 3 | Standard 1 | Standard 2 |
| Stockholders' Equity | $15,000,000 | $30,000,000 | n/a | $10,000,000 | n/a |
| Market Capitalization | n/a | n/a | $75,000,000 or | n/a | $50,000,000 or |
| Total Assets |  |  | $75,000,000 or |  | $50,000,000 or |
| Total Revenue |  |  | $75,000,000 |  | $50,000,000 |
| Pre-tax income | $1,000,000 | n/a | n/a | n/a | n/a |
| Public Float (in shares) | 1,100,000 | 1,100,000 | 1,100,000 | 750,000 | 1,100,000 |
| Operating History | n/a | 2 years | n/a | n/a | n/a |
| Market Value of Public Float | $8,000,000 | $18,000,000 | $20,000,000 | $5,000,000 | $15,000,000 |
| Minimum Bid Price | $5 | $5 | $5 | $1 | $3 |
| Shareholders | 400 | 400 | 400 | 400 | 400 |
| Market Makers | 3 | 3 | 4 | 2 | 4 |
| Coporate Governance | Yes | Yes | Yes | Yes | Yes |

For small capitalization stocks on The Nasdaq Stock Market, the listing requirements are as follows:

| Requirements | Initial Listing | Continued Listing |
| --- | --- | --- |
| Stockholders' Equity | $5,000,000 or | $2,500,000 or |
| Market Capitalization | $50,000,000 or | $35,000,000 or |
| Net Income | $750,000 | $500,000 |
| Public Float (in shares) | 1,000,000 | 500,000 |
| Market Value of Public Float | $5,000,000 | $1,000,000 |
| Minimum Bid Price | $4 | $1 |
| Shareholders | 300 | 300 |
| Operating History | 1 Year | n/a |
| Corporate Governance | Yes | Yes |

Compliance process 46 generates compliance data 48 that is indicative of the state of compliance of the issuer 24, This compliance data 48, which can be in the form of a report that is provided to the user 12 of compliance process 46, is stored on database 35.

Let's assume that a security (e.g., XYZ Corp.) is listed on The Nasdaq Stock Market (Standard 2) and it is a continued listing. If the trading price for the security is $45 per share and there are 1,000,000 outstanding shares, the market capitalization is $45,000,000. Therefore, since The Nasdaq Stock Market (Standard 2) has a minimum market capitalization of $50,000,000, this compliance data (probably in the form of a printed or screen-based report) would indicate that this particular security does not comply with the listing requirements for Standard 2. If this occurs, this specific security may be delisted or switch over to a market that has a lower market capitalization requirement.

Compliance process 46 also includes a data management process 50 that allows user 12 to manage the compliance data 48 stored on database 35. As above, the user 12 can manually inspect this compliance data 48 to see if any of the information is incorrect.

Compliance process 46 also includes a pre-alert process 51 for providing a warning concerning an issuer approaching a point of non-compliance. Pre-alert process 51 monitors numeric compliance requirements (e.g., market capitalization, public float, stockholder's equity, etc.) and compares these values to the actual values of the issuer to determine if the issuer is approaching non-compliance. The point at which the warning is provided is typically a percentage of the required value, which is configurable by the administrator (not shown) of system 10. Continuing with the above-stated example, assume shares of XYZ Corp. are trading for $55.00 per share. With 1,000,000 shares outstanding, the market capitalization value of XYZ Corp. is $55,000,000, thus meeting the listing requirements for Standard 2. Assume that the administrator of system 10 configures pre-alert process 51 so that a warning is provided when the value of the compliance requirement being monitored is within 5% of being non-compliant. Therefore, the warning threshold would be 105% of the required value, namely 105% of $50,000,000 or $52,500,000. If during the trading day, the value of a share of XYZ Corp. drops to $51.00, the market capitalization for the company falls to $51,000,000. Accordingly, XYZ Corp is below the $52,500,000 threshold and pre-alert process 51 would generate a warning that is sent (via notification process 37) to the listing qualification analyst assigned to that particular issuer. At this point, some remedial action may be taken to prevent the security from falling below the $50,000,000 market capitalization requirement.

Since the ramifications of a specific security not meeting the listing requirements for a particular market might be quite severe, a hearing process 52 for reviewing the compliance data 48 and addressing any non-compliance concerns with the issuer of that particular issue is provided. Typically, this hearing process 52 is a manual process, in that the issuer will be contacted and informed of their non-compliance. A hearing will be scheduled in which representatives of the issuer 24 will meet with representatives of the securities market 14 so that the non-compliance concerns can be addressed so that either a plan can be established to get the issuer in compliance or trade the securities on a different market.

During this hearing process, a considerable number of communications will be made between the issuer 24 and the securities market 14. A communication logging process 54 maintains a communication log (not shown) that outlines and itemizes communications between the issuer 24 and securities market, or any other pertinent parties.

A trade process 56 receives trading data 60, concerning the securities offered by issuer 24, from a trading database 58 maintained by securities market 14. Examples of this trading data 60 includes trade volume, trade prices, and quotations.

This data is typically categorized or summarized by reporting brokerage firm. This trading data 60 is also stored on database 35 for later retrieval and use.

A tabular presentation process 62 generates and provides user 12 with a composite report 64 that includes the issue and issuer data 34, the filing and financial data 40, the compliance data 48, and the trade data 60. Report 64 can be presented to user 12 in the form of a printed report or an on-screen report viewable via graphical user interface 20.

Figure 2:
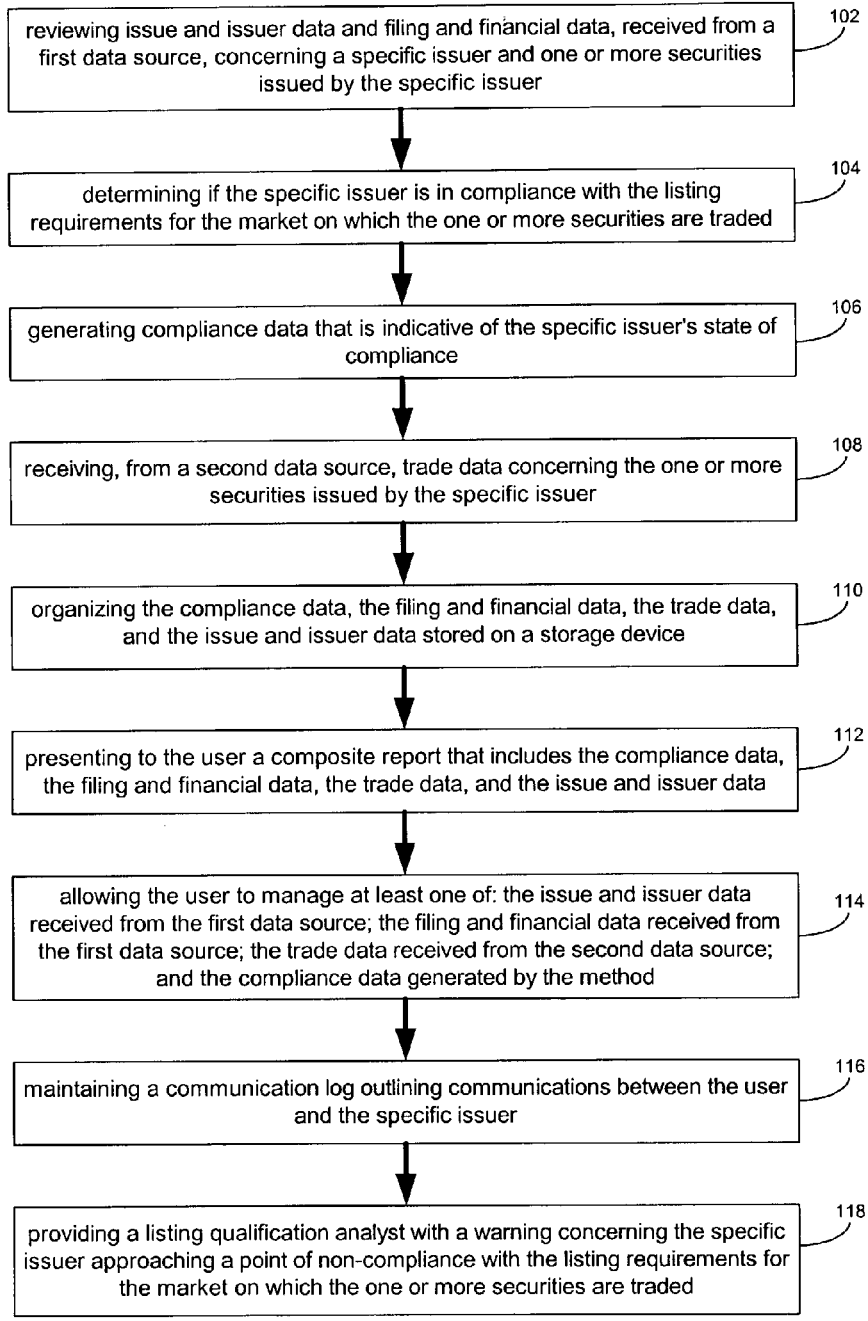
FIG. 2 is a flow chart depicting a method for providing issuer support services.

Referring to FIG. 2, a method 100 for providing issuer support services to a financial market includes reviewing 102 issue and issuer data and filing and financial data, which is received from a first data source and concerns a specific issuer and one or more securities issued by the specific issuer. A determination 104 is made concerning whether the specific issuer is in compliance with the listing requirements for the market on which the one or more securities are traded. Compliance data is generated 106 that is indicative of the specific issuer's state of compliance.

Trade data concerning the one or more securities issued by the specific issuer is received 108 from a second data source. The compliance data, the filing and financial data, the trade data, and the issue and issuer data are organized 110 on a storage device. The user is presented 112 with a composite report that includes the compliance data, the filing and financial data, the trade data, and the issue and issuer data. The user is allowed 114 to manage at least one of: the issue and issuer data received from the first data source; the filing and financial data received from the first data source; the trade data received from the second data source; and the compliance data generated by the method.

A communication log is maintained 116 that outlines communications between the user and the specific issuer. A listing qualification analyst is provided 118 with a warning concerning the specific issuer approaching a point of non-compliance with the listing requirements for the market on which the one or more securities are traded.

A number of embodiments of the invention have been described. Nevertheless, it will be understood that various modifications may be made without departing from the spirit and scope of the invention. Accordingly, other embodiments are within the scope of the following claims.

What is claimed is:

1. A server for providing issuer support services to a financial market, comprising:
   a processor executing:
   a compliance process for reviewing issue and issuer data and filing and financial data, received from a first data source and concerning a specific issuer and one or more securities issued by the specific issuer, to determine if the specific issuer is in compliance with the listing requirements for the market on which the one or more securities are traded, wherein the compliance process generates compliance data indicative of the specific issuer's state of compliance, wherein, if the specific issuer is not in compliance with the listing requirements for the market, a communication logging process produces a communication log regarding communications of the specific issuer during a hearing process; and
   a tabular presentation process for presenting a composite report that includes the compliance data indicative of the specific issuer's state of compliance, the filing and financial data, and the issue and issuer data.

2. The server of claim 1 wherein the processor further executing a trade process for receiving, from a second data source, trade data concerning the one or more securities issued by the specific issuer.

3. The server of claim 2 wherein the second data source is a trade database for the market on which the one or more securities are traded.

4. The server of claim 2 further comprising a storage device storing a database for organizing the compliance data, the filing and financial data, the trade data, and the issue and issuer data.

5. The server of claim 2 wherein the processor further executing a data management process for allowing the user to manage at least one of: the issue and issuer data received from the first data source; the filing and financial data received from the first data source; the trade data received from the second data source; and the compliance data generated by the compliance process.

6. The server of claim 1 wherein the first data source is a database maintained by a governmental regulatory agency.

7. The server of claim 1 wherein the processor further executing a pre-alert process for providing a listing qualification analyst with a warning concerning the specific issuer approaching a point of non-compliance with the listing requirements for the market on which the one or more securities are traded.

8. A server for providing issuer support services to a financial market, comprising:
   a processor; and
   a storage device storing a computer program product for execution by the processor, the computer program product comprising:
   a compliance process for reviewing issue and issuer data and filing and financial data, received from a first data source and concerning a specific issuer and one or more securities issued by the specific issuer, to determine if the specific issuer is in compliance with the listing requirements for the market on which the one or more securities are traded, the compliance process generates compliance data indicative of the specific issuer's state of compliance, wherein, if the specific issuer is not in compliance with the listing requirements for the market, a communication logging process produces a communication log regarding communications of the specific issuer during a hearing process; and
   a tabular presentation process for presenting to a user a composite report that includes the compliance data indicative of the specific issuer's state of compliance, the filing and financial data, and the issue and issuer data.

9. The server of claim 8 wherein the computer program product further comprising a trade process for receiving, from a second data source, trade data concerning the one or more securities issued by the specific issuer.

10. The server of claim 9 wherein the computer program product further comprising a data management process for allowing the user to manage at least one of: the issue and issuer data received from the first data source; the filing and financial data received from the first data source; the trade data received from the second data source; and the compliance data generated by the compliance process.

11. The server of claim 9 wherein the computer program product further comprising a pre-alert process for providing a listing qualification analyst with a warning concerning the specific issuer approaching a point of non-compliance with the listing requirements for the market on which the one or more securities are traded.

12. A server for providing issuer support services to a financial market, comprising:
   a processor; and
   a storage device storing a computer program product for execution by the processor, the computer program product comprising:
   a compliance process for reviewing issue and issuer data and filing and financial data, received from a first data source and concerning a specific issuer and one or more securities issued by the specific issuer, to determine if the specific issuer is in compliance with the listing requirements for the market on which the one or more securities are traded, wherein the compliance process generates compliance data indicative of the specific issuer's state of compliance, wherein, if the specific issuer is not in compliance with the listing requirements for the market, a communication logging process produces a communication log regarding communications of the specific issuer during a hearing process;

a pre-alert process for providing a listing qualification analyst with a warning concerning the specific issuer approaching a point of non-compliance with the listing requirements for the market on which the one or more securities are traded; and a tabular presentation process for presenting a composite report that includes the compliance data indicative of the specific issuer's state of compliance, the filing and financial data, and the issue and issuer data.

13. The server of claim 12 wherein the computer program product further comprising a trade process for receiving, from a second data source, trade data concerning the one or more securities issued by the specific issuer.

14. The server of claim 13 wherein the computer program product further comprising a data management process for allowing the user to manage at least one of: the issue and issuer data received from the first data source; the filing and financial data received from the first data source; the trade data received from the second data source; and the compliance data generated by the compliance process.

15. A computer-implemented method for providing issuer support services to a financial market, comprising:

reviewing, on a remote computer, issue and issuer data and filing and financial data, received from a first data source, concerning a specific issuer and one or more securities issued by the specific issuer;

determining, on a server computer, if the specific issuer is in compliance with the listing requirements for the market on which the one or more securities are traded;

generating, on the server computer, compliance data that is indicative of the specific issuer's state of compliance; and presenting, on the remote computer, a composite report that includes the compliance data indicative of the specific issuer's state of compliance, the filing and financial data, and the issue and issuer data.

16. The computer-implemented method of claim 15 further comprising receiving, from a second data source, trade data concerning the one or more securities issued by the specific issuer.

17. The computer-implemented method of claim 16 further comprising organizing the compliance data, the filing and financial data, the trade data, and the issue and issuer data stored on a storage device.

18. The computer-implemented method of claim 16 further comprising managing at least one of: the issue and issuer data received from the first data source; the filing and financial data received from the first data source; the trade data received from the second data source; and the compliance data generated by the method.

19. The computer-implemented method of claim 15 further comprising providing a listing qualification analyst with a warning concerning the specific issuer approaching a point of non-compliance with the listing requirements for the market on which the one or more securities are traded.

20. A computer program product residing on a non-transitory computer readable medium having a plurality of instructions stored thereon that, when executed by the processor, cause the processor to:

review issue and issuer data and filing and financial data, received from a first data source, concerning a specific issuer and one or more securities issued by the specific issuer;

determine if the specific issuer is in compliance with the listing requirements for the market on which the one or more securities are traded; and generate compliance data indicative of the specific issuer's state of compliance, wherein, if the specific issuer is not in compliance with the listing requirements for the market, a communication logging process produces a communication log regarding communications of the specific issuer during a hearing process; and present a composite report that includes the compliance data indicative of the specific issuer's state of compliance, the filing and financial data, and the issue and issuer data.

21. The computer program product of claim 20 further comprising instructions to receive, from a second data source, trade data concerning the one or more securities issued by the specific issuer.

22. The computer program product of claim 21 further comprising instructions to organize the compliance data, the filing and financial data, the trade data, and the issue and issuer data on a storage device.

23. The computer program product of claim 21 further comprising instructions to allow the user to manage at least one of: the issue and issuer data received from the first data source; the filing and financial data received from the first data source; the trade data received from the second data source; and the generated compliance data.

24. The computer program product of claim 20 further comprising instructions to provide a listing qualification analyst with a warning concerning the specific issuer approaching a point of non-compliance with the listing requirements for the market on which the one or more securities are traded.

25. A system for providing issuer support services to a financial market, comprising:

a server computer executing:

a compliance process for reviewing issue and issuer data and filing and financial data concerning a specific issuer and one or more securities issued by the specific issuer, to determine if the specific issuer is in compliance with the listing requirements for the market on which the one or more securities are traded, wherein the compliance process generates compliance data indicative of the specific issuer's state of compliance, wherein, if the specific issuer is not in compliance with the listing requirements for the market, a communication logging process produces a communication log regarding communications of the specific issuer during a hearing process; and a tabular presentation process for presenting a composite report that includes the compliance data indicative of the specific issuer's state of compliance, the filing and financial data, and the issue and issuer data; and a remote computer that generates a graphical user interface for operating the compliance process.

26. The system of claim 25 wherein the graphical user interface is a web browser.

* * * * *